United States Patent
Je et al.

(10) Patent No.: US 11,274,388 B2
(45) Date of Patent: Mar. 15, 2022

(54) CLOTHING TREATMENT DEVICE AND CONTROL METHOD THEREFOR

(71) Applicant: LG ELECTRONICS INC., Seoul (KR)

(72) Inventors: Jungmoon Je, Seoul (KR); Kiwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 243 days.

(21) Appl. No.: 16/476,956

(22) PCT Filed: Jan. 8, 2018

(86) PCT No.: PCT/KR2018/000358
§ 371 (c)(1),
(2) Date: Jul. 10, 2019

(87) PCT Pub. No.: WO2018/131855
PCT Pub. Date: Jul. 19, 2018

(65) Prior Publication Data
US 2019/0352835 A1 Nov. 21, 2019

(30) Foreign Application Priority Data
Jan. 11, 2017 (KR) .......................... 10-2017-0004354

(51) Int. Cl.
*D06F 33/42* (2020.01)
*F04B 17/03* (2006.01)
*F04B 49/06* (2006.01)
*H02P 27/06* (2006.01)
(Continued)

(52) U.S. Cl.
CPC .............. *D06F 33/42* (2020.02); *F04B 17/03* (2013.01); *F04B 49/06* (2013.01); *H02P 27/06* (2013.01);
(Continued)

(58) Field of Classification Search
CPC combination set(s) only.
See application file for complete search history.

(56) References Cited

U.S. PATENT DOCUMENTS

2016/0115632 A1 4/2016 Jung et al.

FOREIGN PATENT DOCUMENTS

| JP | 3951263 | 8/2007 |
|----|---------|--------|
| JP | 2016-123532 | 7/2016 |

(Continued)

OTHER PUBLICATIONS

Espacenet translation KR 20110112486, Drain Pump of Washing Machine, 2011 (Year: 2011).*

(Continued)

*Primary Examiner* — Cristi J Tate-Sims
(74) *Attorney, Agent, or Firm* — Ked & Associates, LLP (57) ABSTRACT

According to the present invention, a control method for a clothing treatment device comprises the steps of: transmitting a power-related order to a motor that provides electric power to a drain pump in order to perform a dehydration process; detecting a unit revolution count of the motor while the dehydration process is performed; determining whether the detected unit revolution count exceeds a preset limited revolution count; reducing the unit revolution count of the motor to a predetermined unit revolution count if the detected unit revolution count exceeds the limited revolution count; and repeatedly transmitting the power-related order to the motor.

6 Claims, 8 Drawing Sheets

(51) Int. Cl.
*D06F 39/08* (2006.01)
*D06F 103/24* (2020.01)
*D06F 103/48* (2020.01)
*D06F 105/08* (2020.01)
*D06F 105/62* (2020.01)

(52) U.S. Cl.
CPC ............ *D06F 39/08* (2013.01); *D06F 39/085* (2013.01); *D06F 2103/24* (2020.02); *D06F 2103/48* (2020.02); *D06F 2105/08* (2020.02); *D06F 2105/62* (2020.02); *F04B 2203/0209* (2013.01); *F05B 2270/101* (2013.01)

(56) References Cited

FOREIGN PATENT DOCUMENTS

| KR | 10-2000-0045037 | 7/2000 |
| KR | 10-2011-0112486 | 10/2011 |
| KR | 10-2016-0049367 | 5/2016 |

OTHER PUBLICATIONS

KIPO machine translation 10-2000-0045037 Method for Controlling a Drain Pump of a Drum-Type Washing Machine (Year: 2000).*
Espacenet machine translation KR20110112486A Drain Pump of Watching Machine With Embeded Drain Controller (Year: 2011).*
International Search Report (with English Translation) and Written Opinion dated Apr. 29, 2018 issued in Application No. PCT/KR2018/000358.

* cited by examiner

CLOTHING TREATMENT DEVICE AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2018/000358, filed Jan. 8, 2018, which claims priority to Korean Patent Application No. 10-2017-0004354, filed Jan. 11, 2017, whose entire disclosures are hereby incorporated by reference.

TECHNICAL FIELD

The present disclosure relates to a clothing treatment device and a method for controlling the same.

BACKGROUND ART

Clothing treatment devices may be classified into a top-loading type and a front-loading type depending on a laundry input method.

The top-loading type clothing treatment device includes a cabinet forming an outer appearance, a tub provided inside the cabinet to provide a space for accommodating laundry or clothes, and an introduction port provided on an upper surface of the cabinet to communicate with the tub.

The front-loading type clothing treatment device includes a cabinet forming an outer appearance, a tub provided inside the cabinet to provide a space for accommodating clothes, and an introduction port provided on a front surface of the cabinet to communicate with the tub.

A drain pump is used to drain remaining water in a washing tub of the clothing treatment device, and various methods for stable operation of the drain pump are being discussed.

In particular, water generated in the tub of the clothing treatment device may be discharged by a drain pump under pressure of a lift.

In a normal situation, when drainage is completed, only wet clothes remain in the tub and a small amount of water are present in a vortex chamber. When the drain pump is operating, remaining water forms bubbles in the vortex chamber and generates pressure.

When the tub rotates for dehydration, water from the wet clothes is to flow into the vortex chamber. However, internal pressure may result in a situation in which the water does not flow into the vortex chamber. Such a phenomenon is referred to as poor drainage caused by cavitation.

When this phenomenon occurs, a motor needs be stopped or a speed of the motor needs to be reduced to thereby reduce the pressure in the swirl chamber. However, in such a state that when dehydrated water is to be generated cannot be detected, there is such a problem that a time point for stopping the motor or reducing a speed of the motor may not be determined.

As another method, there is a method of detecting poor drainage using a water level frequency of a washing machine. However, this method may not be adopted when a small amount of water is introduced.

Remaining washing water that has not been drained due to the cavitation phenomenon may cause a friction load when the tub rotates. Therefore, since the remaining washing water may cause a large load on a washing machine motor, the remaining washing water may be detected as an abnormal load, and thus, laundry may be stopped.

DISCLOSURE

Technical Problem

An aspect of the present disclosure is to provide a drain pump driving apparatus capable of facilitating drainage and a clothing treatment device having the same.

Another aspect of the present disclosure is to provide a drain pump driving apparatus that may ultimately drain remaining washing water caused by a cavitation phenomenon without having to add an additional sensor, and a clothing treatment device including the drain pump driving apparatus.

Technical Solution

To achieve these and other advantages and in accordance with the purpose of the present disclosure, as embodied and broadly described herein, there is provided a method for controlling a clothing treatment device, the method including: transmitting a power-related order to a motor that supplies power to a drain pump, to perform a dehydration process; detecting a unit revolution count of the motor while the dehydration process is performed; determining whether the detected unit revolution count exceeds a limited revolution count that is preset; reducing the unit revolution count of the motor to a predetermined unit revolution count when the detected unit revolution count exceeds the limited revolution count; and retransmitting the power-related order to the motor.

The method may further include stopping the dehydration process when the detected unit revolution count exceeds the limited revolution count, after the reduction of the unit revolution count of the motor and the retransmission of the power-related order to the motor are performed for a predetermined number of times or more.

The reduction of the unit revolution count of the motor to the predetermined unit revolution count may include a process of reducing the unit revolution count of the motor to the predetermined unit revolution count, and a process of maintaining the unit revolution count of the motor at the predetermined unit revolution count for a preset time period.

The method may further include setting the limited revolution count based on information related to a lift that is a difference between a level of water in a water inlet unit flowing into the drain pump and a level of water in a water outlet unit discharged from the drain pump.

The method may further include setting the predetermined unit revolution count based on information related to a lift that is a difference between a level of water in a water inlet unit flowing into the drain pump and a level of water in a water outlet unit discharged from the drain pump.

The determination of whether the detected unit revolution count exceeds the preset limited revolution count may include a process of detecting an output current of the motor for each preset period, a process of comparing a value of the detected output current with a reference current value, and a process of determining whether the detected unit revolution count exceeds the preset limited revolution count when the detected output current value is lower than the reference current value for a reference number of times or more.

The reference current value may be set based on the power-related order with respect to the motor.

Advantageous Effect

A clothing treatment device according to the present disclosure may smoothly perform drainage by reducing a unit revolution count of a motor that drives a drain pump under a specific condition without having to completely stop the motor.

Further, in the clothing treatment device according to the present disclosure, when remaining washing water is not drained due to a cavitation phenomenon, the cavitation phenomenon may be solved.

Further, in the clothing treatment device according to the present disclosure, drainage may be smoothly performed, and thus, power consumption may be reduced and a failure of the clothing treatment device that may be caused by remaining washing water may be prevented.

MODES FOR CARRYING OUT THE PREFERRED EMBODIMENTS

Hereinafter, the present disclosure will be described in detail with reference to the drawings.

In general, a suffix such as "module" and "unit" may be used to refer to elements or components. Use of such a suffix herein is merely intended to facilitate description of the specification, and the suffix itself is not intended to give any special meaning or function. Accordingly, the terms "module" and "part" may be used interchangeably.

Figure 1:
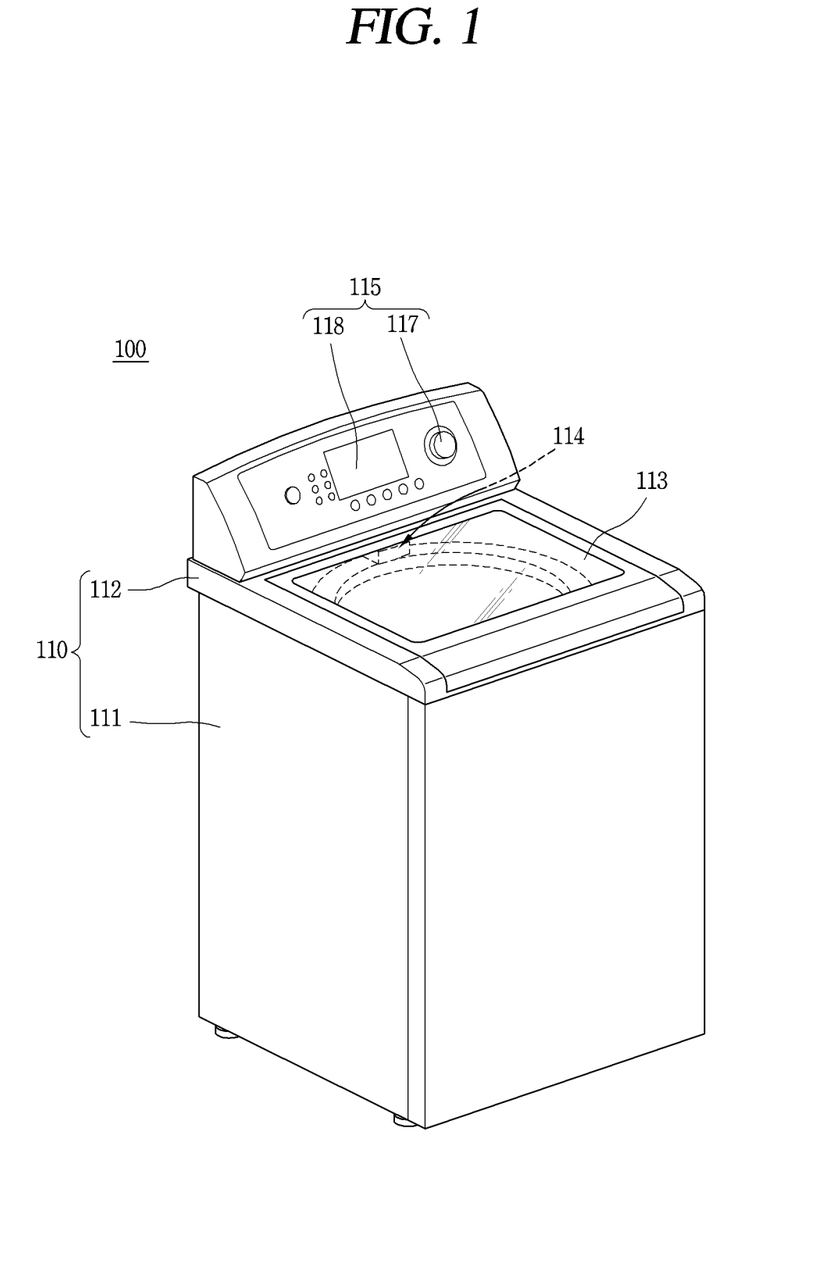
FIG. 1 is a perspective view of a clothing treatment device according to one embodiment of the present disclosure.
Figure 2:
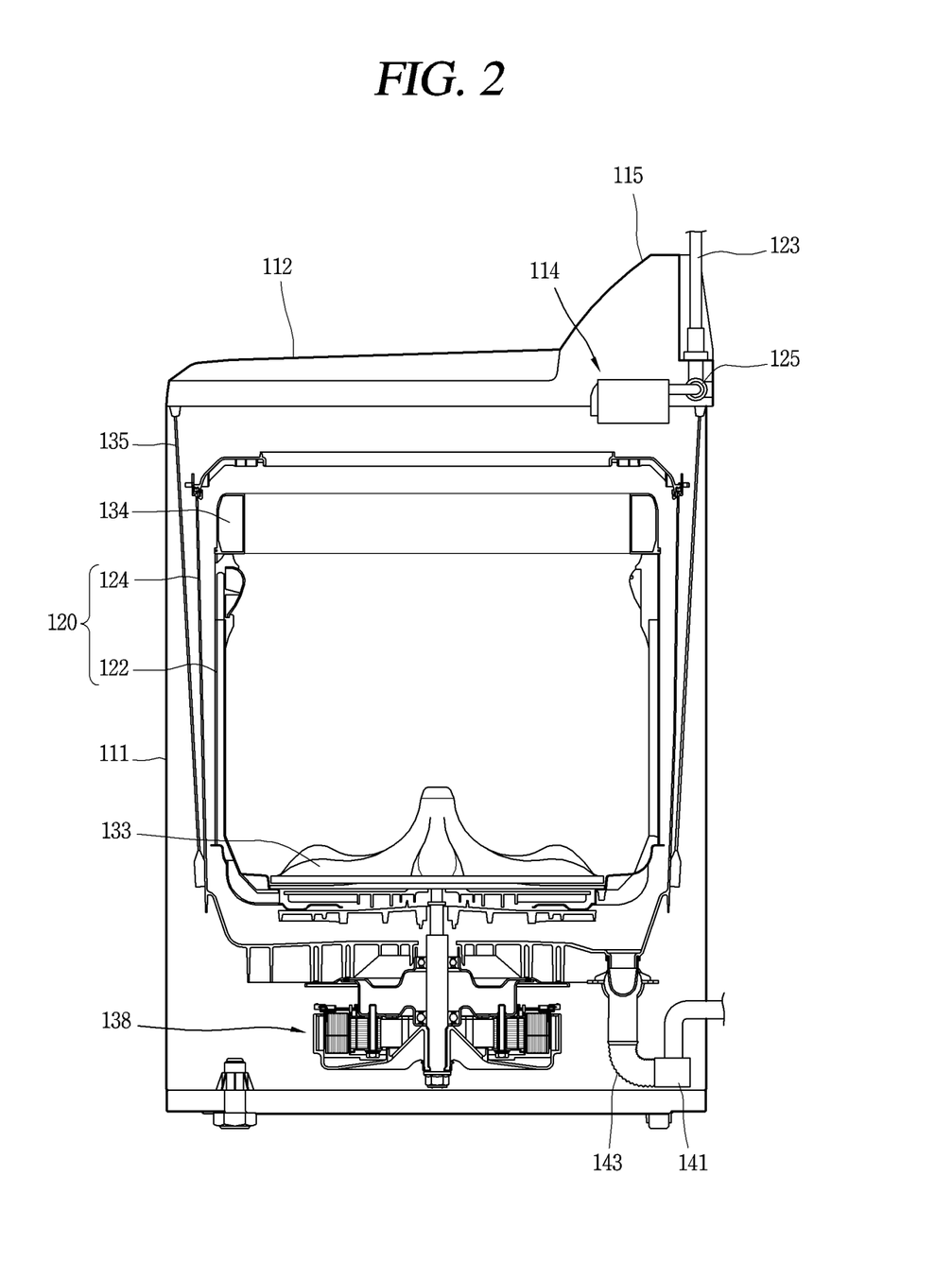
FIG. 2 is a side sectional view of the clothing treatment device of FIG. 1.

FIG. 1 is a perspective view of a clothing treatment device according to one embodiment of the present disclosure. FIG. 2 is a side sectional view of the clothing treatment device of FIG. 1.

As illustrated in FIGS. 1 and 2, a clothing treatment device 100 according to one embodiment of the present disclosure is a concept including a washing machine performing laundry, rinsing, dehydration and the like of clothes or laundry introduced therein, or a dryer which performs drying wet clothes introduced therein. Hereinafter, description will be given mainly of a washing machine.

The washing machine 100 includes a casing 110 forming an outer appearance, a control panel 115 provided with operation keys 117 for receiving various control commands from a user and a display 118 for displaying information related to an operation state of the washing machine 100 to thereby provide a user interface, and a door 133 rotatably installed at the casing 110 to open and close an inlet/outlet hole through which the laundry is taken in and out.

The casing 110 includes a main body 111 forming a space in which various components of the washing machine 100 may be accommodated, and a top cover 112 provided on a top of the main body 111 and having a clothes inlet/outlet hole through which the clothes may be taken in and out.

The casing 110 is described as including the main body 111 and the top cover 112. However, the casing 110 is not limited thereto, when the casing 110 forms the outer appearance of the washing machine 100.

Support rods 135 are described as being coupled to the top cover 112, which is one of components of the casing 110. However, the support rod 135 is not limited thereto. The support rod 135 may be coupled to any of a fixed portion of the casing 110.

The control panel 115 includes the operation keys 117 for operating operation states of the clothing treatment device 100, and the display 118 disposed at one side of the operation keys 117 and displaying the operation states of the clothing treatment device 100.

The door 113 opens and closes the clothes inlet/outlet hole (not shown) provided at the top cover 112, and may include a transparent member such as tempered glass so that an inside of the main body 111 may be seen.

The washing machine 100 may include a washing tub 120. The washing tub 120 may include an outer tub 124 containing washing water and the inner tub 122 rotatably provided in the outer tub 124 to receive laundry. A balancer 134 may be provided on a top of the washing tub 120 to compensate for eccentricity generated when the washing tub 120 rotates.

The washing machine 100 may include a pulsator 133 rotatably provided at a lower portion in the washing tub 120.

A driving apparatus 138 is to supply a driving force for rotating the inner tub 122 and/or the pulsator 133. A clutch (not shown) to selectively transmit the driving force of the driving apparatus 138 may be provided so that only the inner tub 122 or only the pulsator 133 rotates or both the inner tub 122 and the pulsator 133 rotate simultaneously.

Figure 3:
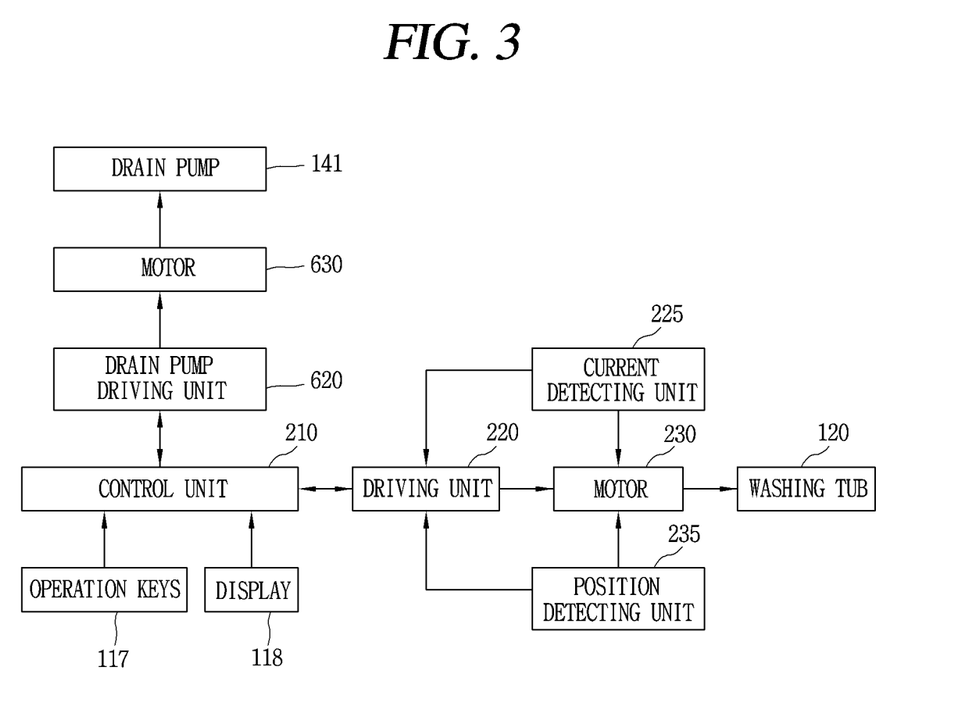
FIG. 3 is an internal block diagram of the clothing treatment device of FIG. 1.

The driving apparatus 138 is operated by a driving unit 220 of FIG. 3, that is, a driving circuit. This will be described later with reference to FIG. 3.

The top cover 112 is provided with a detergent box 114 disposed therein to be drawn in and out to contain various detergents, such as laundry detergent, fabric softener and/or bleach. Washing water fed through a feedwater flow path 123 is supplied into the inner tub 122 via the detergent box 114.

A plurality of holes (not shown) are formed through the inner tub 122 so that the washing water supplied to the inner tub 122 flows to the outer tub 124 through the plurality of holes. A feedwater valve 125 for opening and closing the feedwater flow path 123 may be provided.

The washing water inside the outer tub 124 is drained through a drain flow path 143. A drain valve 145 to open and close the drain flow path 143 and a drain pump 141 to pump up the washing water may be provided.

The support rods 135 is to suspend the outer tub 124 in the casing 110. Each support rod 135 has one end connected to the casing 110, and another end connected to the outer tub 124 by a suspension 150.

The suspension 150 buffers vibration of the outer tub 124 during the operation of the washing machine 100. For example, the outer tub 124 may vibrate due to vibration generated as the inner tub 122 rotates. The suspension 150 may buffer the vibration of the outer tub 124 caused by various factors such as an eccentric state of the laundry contained in the inner tub 122, a rotation speed of the inner tub 122, resonance characteristics, and the like.

FIG. 3 is an internal block diagram of the clothing treatment device 100 of FIG. 1.

Referring to FIG. 3, in the clothing treatment device 100, the driving unit 220 is controlled by a control operation of the control unit 210. The driving unit 220 drives a motor 230. Accordingly, the washing tub 120 is rotated by the motor 230.

The clothing treatment device 100 may include a motor 630 to drive the drain pump 141, and a drain pump driving unit 620 to control the motor 630. The drain pump driving unit 620 may be controlled by the control unit 210.

In the present specification, the drain pump driving unit 620 may be also referred to as a drain pump driving apparatus 620.

The control unit 210 is operated by receiving an operation signal from the operation keys 117. Accordingly, washing, rinsing and dehydration processes may be performed.

The control unit 210 may control the display 118 to display a wash course, a wash time, a dehydration time, a rinsing time, or a current operation state.

The control unit 210 controls the driving unit 220 to operate the motor 230. For example, the control unit 210 may control the driving unit 220 to rotate the motor 230 based on a current detecting unit 225 for detecting an output current flowing in the motor 230 and a position detecting unit 235 for detecting a position of the motor 230. It is illustrated in the drawing that the detected current and the detected position signal are input to the driving unit 220. However, the present disclosure is not limited thereto. Alternatively, the detected current and the detected position signal may be input to the control unit 210 or both the control unit 210 and the driving unit 220.

The driving unit 220 is to drive the motor 230, and may include an inverter (not shown) and an inverter control unit (not shown). Further, the driving unit 220 may be a concept further including a converter to supply direct current (DC) power input to the inverter (not shown).

For example, when the inverter control unit (not shown) outputs a pulse width modulation (PWM) type switching control signal Sic (shown in FIG. 5) to the inverter (not shown), the inverter (not shown) may perform a fast switching operation to supply alternating current (AC) power of a predetermined frequency to the motor 230.

The control unit 210 may detect an amount of laundry based on a current detected by the current detecting unit 225 or a position signal detected by the position detecting unit 235. For example, while the washing tub 120 rotates, the amount of laundry may be detected based on a value of the current of the motor 230.

The control unit 210 may detect eccentricity of the washing tub 120, that is, unbalance (UB) of the washing tub 120. This eccentricity detection may be performed based on a ripple component of the current detected by the current detection unit 225 or a rotation speed variation of the washing tub 120.

Figure 4:
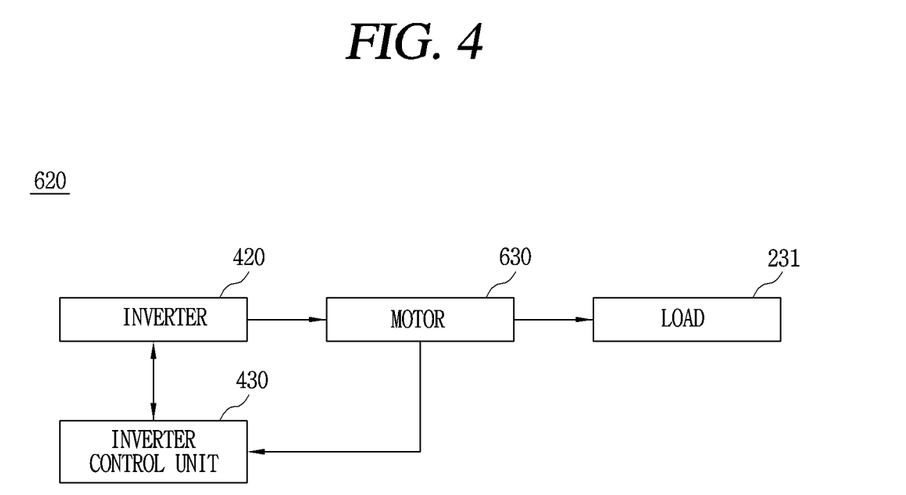
FIG. 4 illustrates an example of an internal block diagram of a drain pump driving apparatus of FIG. 1.
Figure 5:
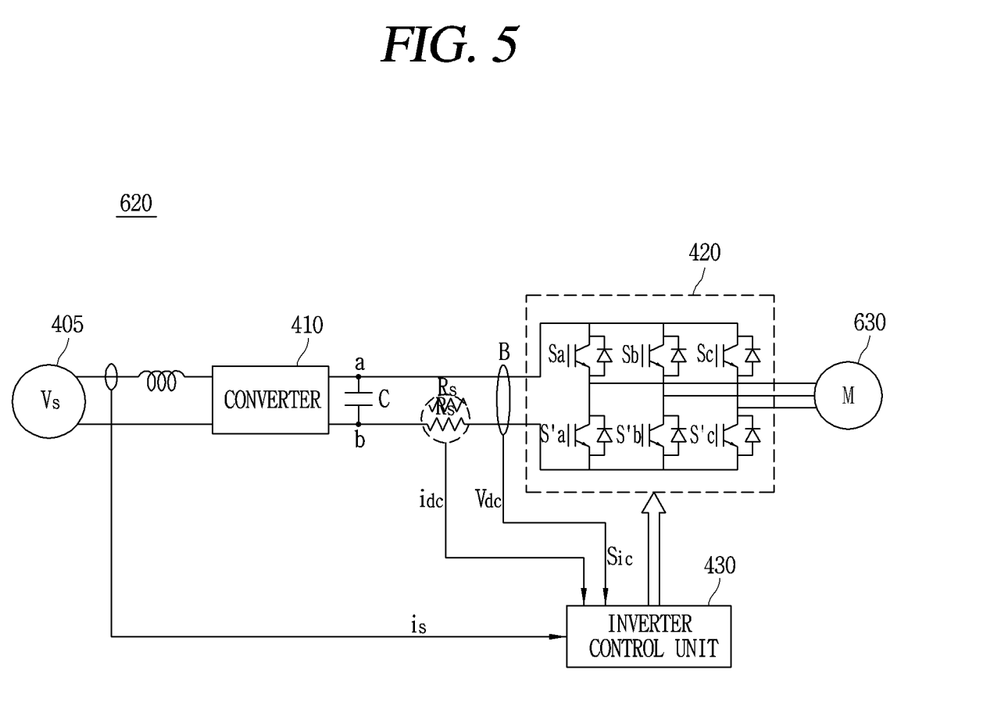
FIG. 5 illustrates an example of an internal circuit diagram of the drain pump driving apparatus of FIG. 4.

FIG. 4 illustrates an example of an internal block diagram of the drain pump driving apparatus of FIG. 1. FIG. 5 illustrates an example of an internal circuit diagram of the drain pump driving apparatus of FIG. 4.

Referring to the drawings, the drain pump driving apparatus 620 according to one embodiment of the present disclosure is to drive the motor 630 in a sensorless method and may include an inverter 420 and an inverter control unit 430.

Figure 6:
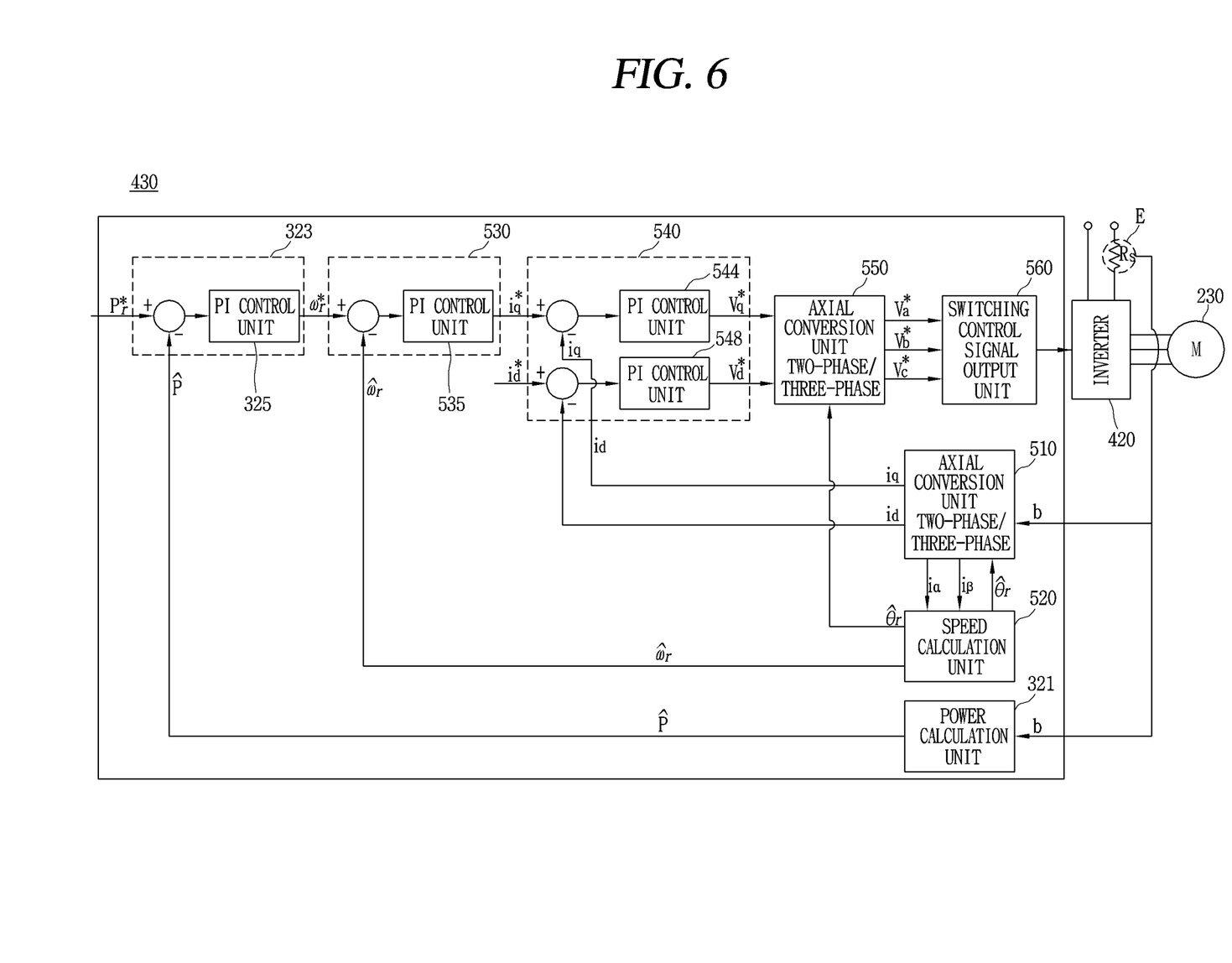
FIG. 6 is an internal block diagram of an inverter control unit of FIG. 5.

The drain pump driving apparatus 620 according to one embodiment of the present disclosure may include a converter 410, a DC-link voltage detection unit B, a smoothing capacitor C, and an output current detection unit E (shown in FIG. 6). Further, the drain pump driving apparatus 620 may further include an input current detection unit, a reactor, and the like.

Hereinafter, an operation of each constituent unit in the drain pump driving apparatus 620 of FIGS. 4 and 5 will be described.

The reactor is disposed between a commercial AC power source 405 $v_s$ and the converter 410, and performs a power factor correcting or boosting operation. In addition, the reactor may also perform a function of limiting a harmonic current due to fast switching of the converter 410.

The input current detection unit may detect an input current is applied from the commercial AC power source 405. To do so, a current transformer (CT), a shunt resistor, or the like may be used as the input current detection unit. The detected input current is may be input to the inverter control unit 430 as a pulse type discrete signal.

The converter 410 converts the commercial AC power source 405, which has passed through the reactor, into DC power and outputs the DC power. Although the commercial AC power source 405 is shown as a single-phase AC power source in the drawing, the commercial AC power source 405 may be a three-phase AC power source. An internal structure of the converter 410 also varies depending on a type of the commercial AC power source 405.

The converter 410 may be configured with a diode or the like without a switching element, and may perform a rectifying operation without a separate switching operation.

For example, in a case of a single-phase AC power source, four diodes may be used in a form of a bridge. In a case of a three-phase AC power source, six diodes may be used in a form of a bridge.

The converter 410, for example, may be a half-bridge type converter in which two switching elements and four diodes are connected. In a case of a three-phase AC power source, six switching elements and six diodes may be used.

When the converter 410 includes a switching element, the converter 410 may perform a boosting operation, a power factor correction, and a DC power conversion by a switching operation of the switching element.

The smoothing capacitor C smooths input power and stores it. In the drawing, one element is illustrated as the smoothing capacitor C, but a plurality of elements may alternatively be provided to ensure element stability.

The smoothing capacitor C is illustrated as being connected to an output end of the converter 410, but the present disclosure is not limited thereto. Alternatively, DC power may be input directly to the smoothing capacitor C. For example, DC power from a solar cell may be input to the smoothing capacitor C directly or after DC/DC conversion. Hereinafter, portions illustrated in the drawing will be mainly described.

Both ends of the smoothing capacitor C may be referred to as a DC-link or a DC-link end since DC power is stored at the both ends of the smoothing capacitor C.

The DC-link voltage detection unit B may detect DC-link voltages Vdc which are both ends of the smoothing capacitor C. To this end, the DC-link voltage detection unit B may include a resistor element, an amplifier, and the like. The detected DC-link voltage Vdc may be input to the inverter control unit 430 as a pulse type discrete signal.

The inverter 420 may include a plurality of inverter switching elements, and convert smoothed DC power Vdc into three-phase AC power having a predetermined frequency by a switching-on/off operation of the switching elements so as to output the three-phase AC power to the motor 630 that is a three-phase synchronous motor.

The inverter 420 is provided with upper-arm switching elements Sa, Sb and Sc and lower-arm switching elements S'a, S'b and S'c which are connected in series as pairs, respectively, and thus totally three pairs of upper and lower-arm switching elements Sa & S'a, Sb & S'b, Sc & S'c) are connected in parallel. Diodes are connected in anti-parallel to the switching elements Sa, S'a, Sb, S'b, Sc, S'c, respectively.

The switching elements in the inverter 420 are switched on and off based on the inverter switching control signal Sic from the inverter control unit 430. Accordingly, the three-phase AC power having the predetermined frequency is output to the three-phase synchronous motor 630.

The inverter control unit 430 may control the switching operation of the inverter 420 in a sensorless method. For this purpose, the inverter control unit 430 may receive an output current idc detected by the output current detection unit E.

The inverter control unit 430 outputs the inverter switching control signal Sic to the inverter 420 in order to control the switching operation of the inverter 420. The inverter switching control signal Sic is a PWM type switching control signal, and is generated and output based on the output current idc detected by the output current detection unit E. A detailed operation of the output of the inverter switching control signal Sic in the inverter control unit 430 will be described later with reference to FIG. 6.

The output current detection unit E may detect the output current idc flowing to the three-phase synchronous motor 630.

The output current detection unit E may be arranged between the DC-link capacitor C and the inverter 420 to detect the output current Idc flowing to the motor.

In particular, the output current detection unit E may include one shunt resistor element $R_s$.

The output current detection unit E may use the single shunt resistor element Rs to detect a phase current as an output current idc flowing to the motor 630 in a time division manner when the lower-arm switching element of the inverter unit 420 is turned on.

The detected output current idc which is a pulse type discrete signal may be applied to the inverter control unit 430 and the inverter switching control signal Sic is generated based on the detected output current idc. Hereinafter, description will be given under assumption that the detected output current idc is a three-phase output current.

On the other hand, the three-phase motor synchronous 630 has a stator and a rotor, and each phase AC power of a predetermined frequency is applied to a coil of the stator of each phase (a, b, and c-phases), thereby rotating the rotor.

The motor 630 may include a brushless DC (BLDC) motor.

For example, the motor 630 may include a surface mounted permanent magnet synchronous motor (SMPMSM), an interior permanent magnet synchronous motor (IPMSM), and a synchronous reluctance motor (Synrm), and the like. Among others, the SMPMSM and the IPMSM are permanent magnet synchronous motors (PMSMs) employing a permanent magnet, and the Synrm does not use a permanent magnet.

FIG. 6 is an internal block diagram of the inverter control unit 430 of FIG. 5.

Referring to FIG. 6, the inverter control unit 430 may include an axial conversion unit 510, a speed calculation unit 520, a power calculation unit 321, a speed order generation unit 323, a current order generation unit 530, a voltage order generation unit 540, an axial conversion unit 550, and a switching control signal output unit 560.

The axial conversion unit 510 may extract the phase currents from the output current idc detected by the output current detection unit E, and convert the extracted phase currents into two-phase currents iα and iβ of a stationary coordinate system.

On the other hand, the axial conversion unit 510 may convert the two-phase current iα and iβ of the stationary coordinate system into two-phase currents id and iq of a rotating coordinate system.

The speed calculation unit 520 may estimate a position $\hat{\theta}_r$ based on the output current idc detected by the output current detection unit E and calculate a speed $\hat{\omega}_r$ by differentiating the estimated position.

The power calculation unit 321 may calculate power or a load of the motor 630 based on the output current idc detected by the output current detection unit E.

The speed order generation unit 323 generates a speed order value $\omega^*_r$ based on power P calculated by the power calculation unit 321 and a power order value $P^*_r$. For example, the speed order generation unit 323 may perform a PI control in a PI control unit 325 based on a difference between the calculated power P and the power order value $P^*_r$, and generate the speed order value $\omega^*_r$.

On the other hand, the current order generation unit 530 generates a current order value $i^*_q$ based on a computation speed $\hat{\omega}_r$ and the speed order value $\omega^*_r$. For example, the current order generation unit 530 may perform proportional integral (PI) control in a PI control unit 535 based on a difference between the computation speed $\hat{\omega}_r$ and the speed order value $\omega^*_r$, and generate the current order value $i^*_q$. In the drawing, a q-axis current order value $i^*_q$ is illustrated as the current order value, but it is also possible to generate a d-axis current order value $i^*_d$ as well, unlike the drawing. On the other hand, a value of the d-axis current order $i^*_d$ may be set to zero.

On the other hand, the current order generation unit 530 may further include a limiter (not shown) for limiting a level of the current order value $i^*_q$ so that the current order value $i^*_q$ does not exceed an allowable range.

Next, the voltage order generation unit 540 generates d-axis and q-axis voltage order values $v^*_d$ and $v^*_q$, based on d-axis and q-axis currents $i_d$ and $i_q$ that are axially converted to a two-phase rotating coordinate system in the axial conversion unit and the current order values $i^*_d$ and $i^*_q$ from the current order generation unit 530. For example, the voltage order generation unit 540 may perform a PI control in a PI control unit 544 based on a difference between the q-axis current $i_q$ and the q-axis current order value $i^*_q$, and generate the q-axis voltage order value $v^*_q$. The voltage order generation unit 540 may perform the PI control in the PI control unit 548 based on a difference between the d-axis current $i_d$ and the d-axis current order value $i^*_d$, and generate the d-axis voltage order value $v^*_d$. The voltage order generation unit 540 may further include a limiter (not shown) for limiting a level of the d-axis and q-axis voltage order values $v^*_d$ and $v^*_q$, so that the d-axis and q-axis voltage order values $v^*_d$ and $v^*_q$ do not exceed an allowable range.

On the other hand, the generated d-axis and q-axis voltage order values $v^*_d$ and $v^*_q$ are input to the axial conversion unit 550.

The axial conversion unit 550 performs an axial conversion by receiving the position $\hat{\theta}_r$ calculated by the speed calculation unit 520 and the d-axis and q-axis voltage order values $v^*_d$ and $v^*_q$.

First, the axial conversion unit 550 performs conversion from the two-phase rotating coordinate system to a two-phase stationary coordinate system. At this time, the position $\hat{\theta}_r$ calculated by the speed calculation unit 520 may be used.

Then, the axial conversion unit 550 performs conversion from the two-phase stationary coordinate system to a three-phase stationary coordinate system. Through these conversions, the axial conversion unit 510 outputs three-phase output voltage order values $v^*a$, $v^*b$, and $v^*c$.

The switching control signal output unit 560 generates an inverter switching control signal Sic according to the PWM method based on the three-phase output voltage order values $v^*a$, $v^*b$, and $v^*c$, and outputs the generated inverter switching control signal Sic.

The output inverter switching control signal Sic may be converted into a gate driving signal in a gate driving unit (not shown) and input to a gate of each switching element in the inverter 420. As a result, each of the switching elements Sa, S'a, Sb, S'b, Sc, and S'c in the inverter 420 performs the switching operation.

Figure 7:
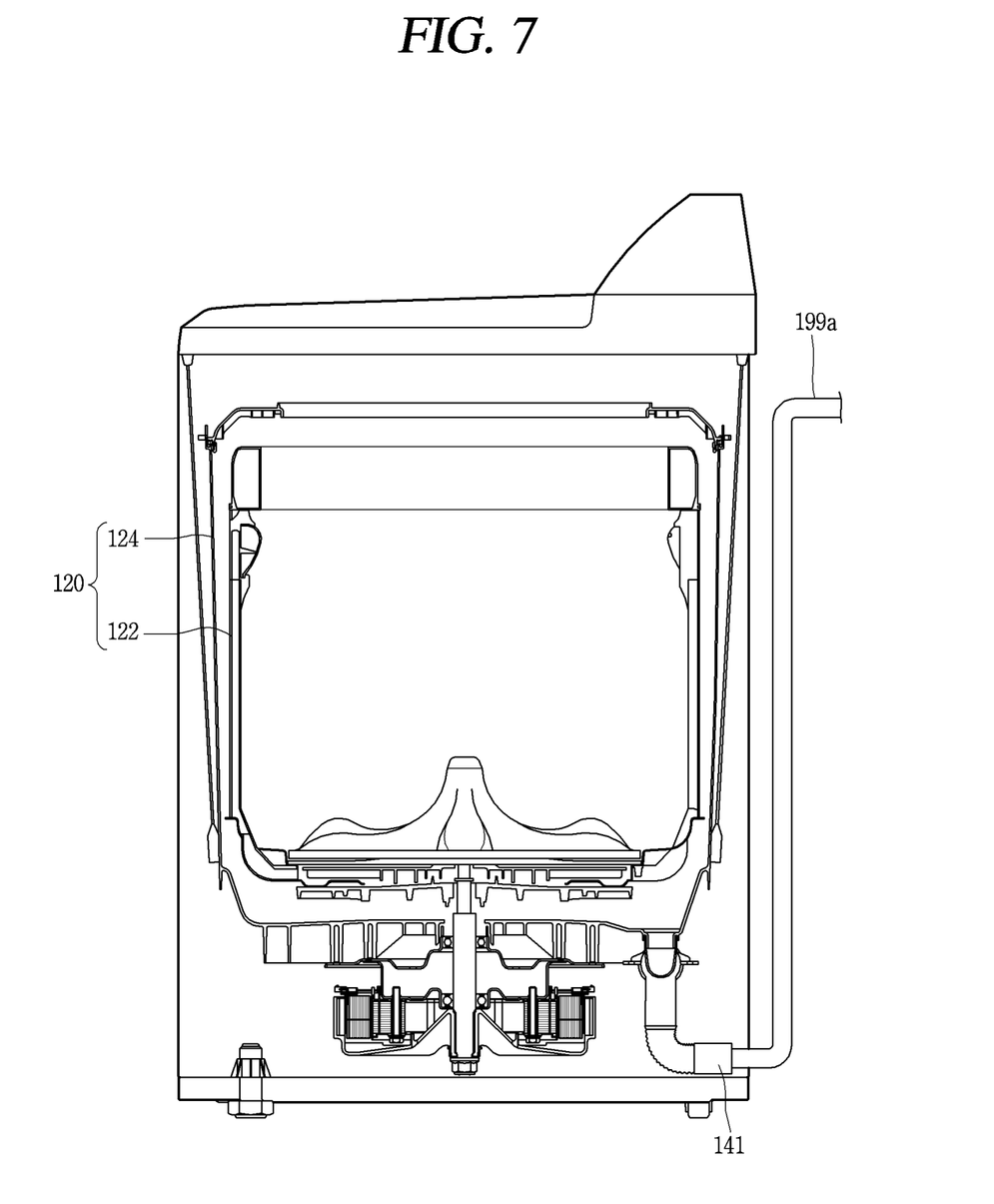
FIG. 7 is a diagram illustrating various examples of a drain pipe connected to a drain pump in the clothing treatment device of FIG. 1.

FIG. 7 is a diagram illustrating various examples of a drain pipe connected to a drain pump in the clothing treatment device of FIG. 1.

When the clothing treatment device 100 is installed in a basement, a drain pipe 199a needs to extend to ground for drainage. Accordingly, as shown in FIG. 7, the drain pipe 199a needs to extend to a position remarkably higher than that of the drain pump 141.

In this case, when the drain pump 141 is implemented as a solenoid type, since pumping is weak, the drainage may not be performed smoothly.

Accordingly, a motor may be preferably used to drive the drain pump 141. In the related art, an AC motor was used to be driven at a constant speed of approximately 3000 rpm or 3600 rpm using AC power at 50 Hz or 60 Hz.

In this case, irrespective of a height of the drain pump 141, since the motor is driven at a constant speed, noise is generated due to movement of remaining water in the drain pipe 199a.

In the present disclosure, to solve this problem, it is assumed that the motor 630 with variable speeds is used.

That is, the motor 630 for driving the drain pump 141 according to one embodiment of the present disclosure may be a BLDC motor 630.

Further, in the present disclosure, in order to vary a speed of the motor 630, a lift is calculated and a rotation speed of the motor 630 is controlled to be variable based on the calculated lift, wherein the lift is a difference between a level of water in a water inlet unit flowing into the drain pump 630 and a level of water in a water outlet unit discharged from the drain pump 141.

Figure 8:
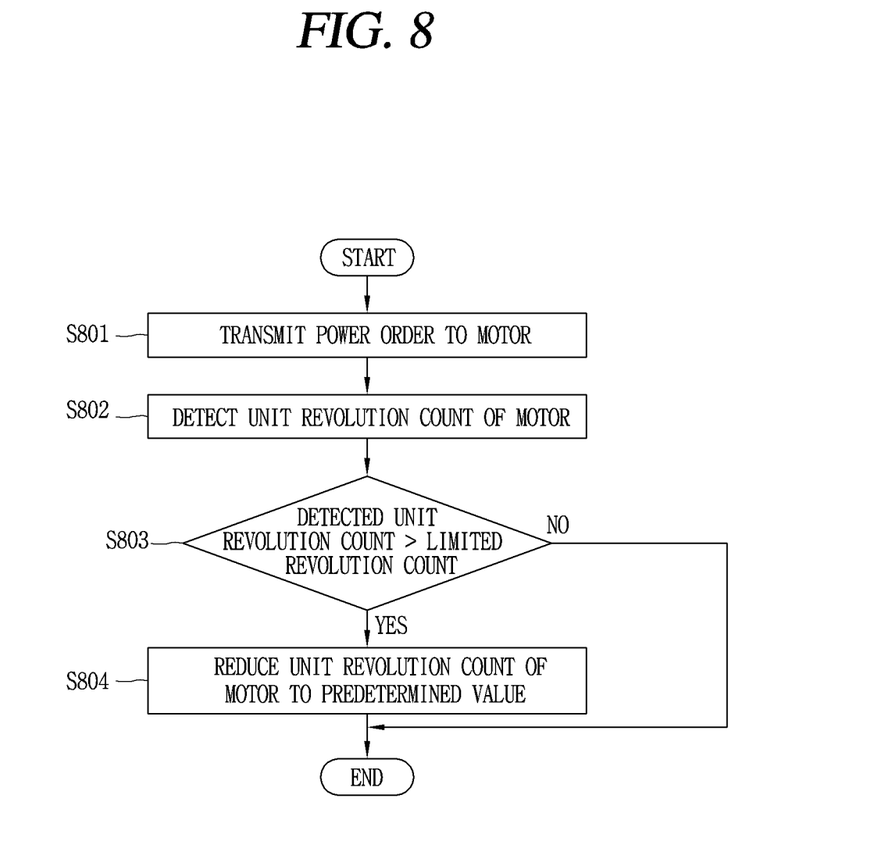
FIG. 8 is a flowchart of a method for controlling the clothing treatment device according to one embodiment of the present disclosure.

Hereinafter, a method for controlling the clothing treatment device including a drain pump according to the present disclosure is described with reference to FIG. 8.

First, an inverter control unit in the clothing treatment device may transmit a power-related order to a motor that supplies power to a drain pump, to perform a dehydration process (S801).

Then, the inverter control unit may detect a unit revolution count of the motor during the dehydration process (S802).

The inverter control unit may determine whether the detected unit revolution count exceeds a preset limited revolution count (S803).

In detail, the inverter control unit may detect output current of the motor in each preset period, and compares a value of the detected current and a reference current value. When the detected current value is lower than the reference current value for a reference number of times or more, it may be determined that the detected unit revolution count exceeds the preset limited revolution count.

In addition, the reference current value may be set based on the power-related order with respect to the motor.

Here, when the detected unit revolution count exceeds the limited revolution count, the inverter control unit may reduce the unit revolution count of the motor to a predetermined unit revolution count (S804).

For example, the limited revolution count may be 3600 rpm, and the predetermined unit revolution count may be 2000 rpm.

When the detected unit revolution count exceeds the limited revolution count, the inverter control unit may reduce the unit revolution count of the motor to a predetermined unit revolution count and maintain the predetermined unit revolution count for a preset time period.

The inverter control unit may retransmit the power-related order to the motor (S805).

That is, when the detected unit revolution count exceeds the limited revolution count, the inverter control unit may reduce the unit revolution count of the motor for a predetermined time period. Then, when the predetermined time period elapses, the inverter control unit may retransmit the order, which was transmitted to the motor before the inverter control unit reduces the unit revolution count of the motor, to the motor.

The inverter control unit may set the limited revolution count based on information related to a lift, which is a difference between a level of water in a water inlet unit flowing into the drain pump and a level of water in a water outlet unit discharged from the drain pump.

In addition, the inverter control unit may set the unit revolution count based on the information related to a lift, which is a difference between a level of water in the water inlet unit flowing into the drain pump and a level of water in the water outlet unit discharged from the drain pump.

After the inverter control unit performs the reduction of the unit revolution count of the motor and the retransmission of the power-related order to the motor for a predetermined number of times or more, when the detected unit revolution count exceeds the limited revolution count, the dehydration process may be stopped.

Figure 9:
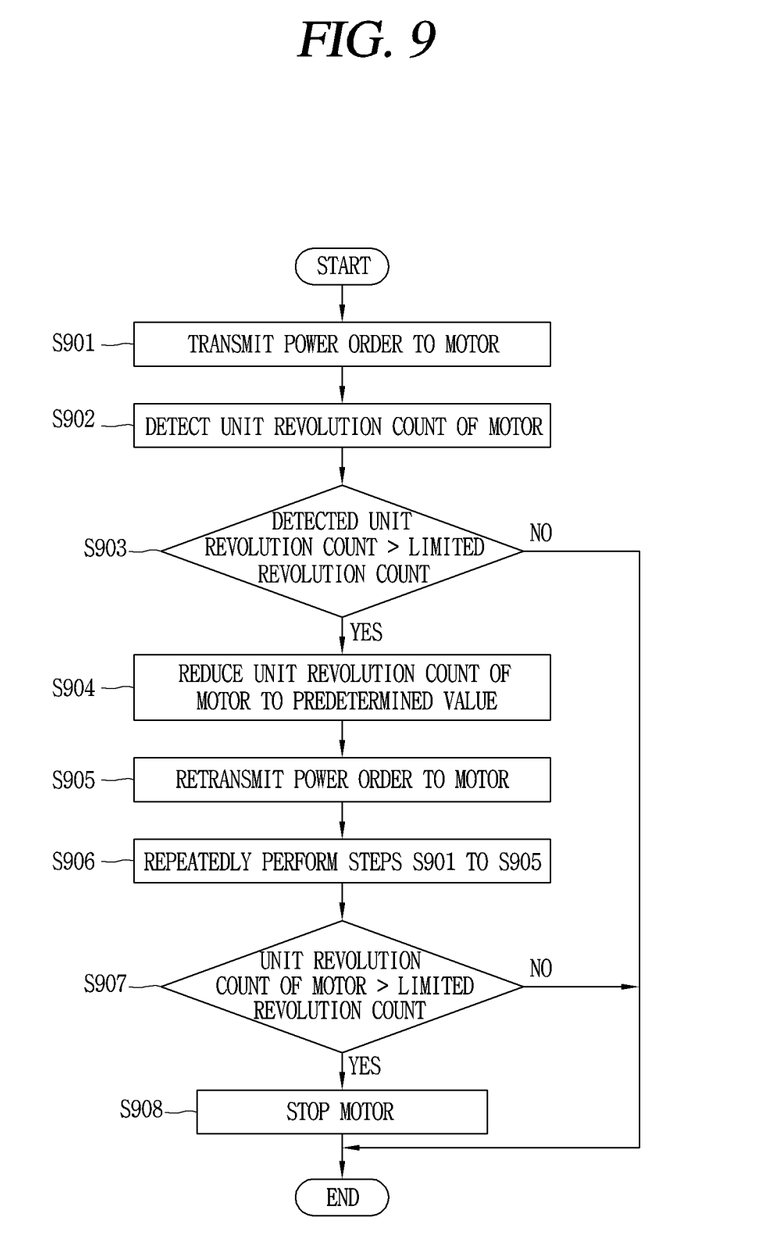
FIG. 9 is a flowchart of a method for controlling the clothing treatment device according to another embodiment of the present disclosure.

Hereinafter, a method of controlling the clothing treatment device including a drain pump according to the present disclosure will be described with reference to FIG. 9.

First, an inverter control unit in the clothing treatment device may transmit a power-related order to a motor that supplies power to a drain pump, to perform a dehydration process (S901).

Then, the inverter control unit may detect a unit revolution count of the motor during a dehydration process (S902).

The inverter control unit may determine whether the detected unit revolution count exceeds a preset limited revolution count (S903).

When the detected unit revolution count exceeds the preset limited revolution count, the inverter control unit may reduce the unit revolution count of the motor to a predetermined value (S904).

The inverter control unit may retransmit the power-related order to the motor to thereby recover the unit revolution count of the motor (S905). In addition, the inverter control unit may perform operations S901 to S905 repeatedly for a predetermined number of times or more.

After the inverter control unit performs operations S901 to S905 repeatedly for a predetermined number of times or more, the inverter control unit may redetermine whether the unit revolution count of the motor exceeds the limited revolution count (S907).

After the inverter control unit performs operations S901 to S905 repeatedly for a predetermined number of times or more, when the unit revolution count of the motor exceeds the limited revolution count, the inverter control unit may stop the motor (S908).

The clothing treatment device according to the present disclosure may smoothly perform drainage by reducing a unit revolution count of a motor under a particular condition without having to completely stop the motor that drives a drain pump.

Further, in the clothing treatment device according to the present disclosure, when remaining washing water is not drained due to a cavitation phenomenon, the cavitation phenomenon may be solved.

Further, in the clothing treatment device according to the present disclosure, drainage may be smoothly performed, and thus, power consumption may be reduced and a failure of the clothing treatment device that may be caused by remaining washing water may be prevented.

The invention claimed is:

1. A method for controlling a clothing treatment device that includes a motor and a drain pump, the method comprising:
    transmitting a power-related order to the motor, the motor to supply power to the drain pump;
    performing a dehydration operation based on the transmitted power-related order;
    while performing the dehydration operation, detecting a unit revolution count of the motor;
    determining whether the detected unit revolution count is greater than a preset limited revolution count;
    when the detected unit revolution count is determined to be greater than the preset limited revolution count, reducing the unit revolution count of the motor to a predetermined unit revolution count; and
    retransmitting the power-related order to the motor,
    wherein the method further comprises:
        setting the limited revolution count based on information related to a lift, wherein the lift corresponds a difference between a water level at a water inlet into the drain pump and a water level at a water outlet unit from the drain pump.

2. The method of claim 1, further comprising:
    after the reducing of the unit revolution count of the motor and the retransmitting of the power-related order to the motor are performed at least a predetermined number of times, stopping the dehydration operation when the detected unit revolution count is determined to exceed the limited revolution count.

3. The method of claim 1, wherein the reducing of the unit revolution count of the motor to the predetermined unit revolution count includes:
    reducing the unit revolution count of the motor to the predetermined unit revolution count, and
    maintaining, for a preset time period, the unit revolution count of the motor at the predetermined unit revolution count.

4. The method of claim 1, further comprising:
    setting the predetermined unit revolution count based on information related to a lift, wherein the lift corresponds to a difference between a water level at a water inlet into the drain pump and a water level at a water outlet unit from the drain pump.

5. The method of claim 1, wherein the determination of whether the detected unit revolution count is greater than the preset limited revolution count includes:
    detecting an output current of the motor for each preset period,
    comparing a value of the detected output current with a reference current value, and
    determining that the detected unit revolution count is greater than the preset limited revolution count when the detected output current value is determined to be less than the reference current value for at least a predetermined number of times.

6. The method of claim 5, wherein the reference current value is set based on the power-related order.

* * * * *